United States Patent
Yokoyama et al.

(10) Patent No.: US 10,343,548 B2
(45) Date of Patent: Jul. 9, 2019

(54) ONBOARD BATTERY FOR VEHICLE

(71) Applicant: SUBARU CORPORATION, Tokyo (JP)

(72) Inventors: Yutaka Yokoyama, Tokyo (JP); Toshiyuki Hara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/486,407

(22) Filed: Apr. 13, 2017

(65) Prior Publication Data

US 2017/0334310 A1    Nov. 23, 2017

(30) Foreign Application Priority Data

May 19, 2016    (JP) .................. 2016-100176

(51) Int. Cl.
*B60L 11/18*    (2006.01)
*H01M 10/613*    (2014.01)
(Continued)

(52) U.S. Cl.
CPC ............ *B60L 11/1877* (2013.01); *B60K 1/04* (2013.01); *B60L 50/66* (2019.02); *B60L 58/26* (2019.02);
(Continued)

(58) Field of Classification Search
CPC ........ B60L 11/1874; B60K 2001/0438; H01M 10/625; H01M 10/6563
See application file for complete search history.

(56) References Cited

U.S. PATENT DOCUMENTS 4,840,855 A * 6/1989 Foti ................. H01M 2/1072
429/120
6,798,658 B2 * 9/2004 Takedomi .............. B60K 1/04
180/68.5
(Continued)

FOREIGN PATENT DOCUMENTS

CN    101547810 A    9/2009
CN    101687460 A    3/2010
(Continued)

OTHER PUBLICATIONS

Decision to Grant a Patent for JP Patent Application No. 2016-100176, dated May 15, 2018, 03 pages of Office Action and 02 pages of English Translation.
(Continued)

*Primary Examiner* — Frank B Vanaman
(74) *Attorney, Agent, or Firm* — Chip Law Group

(57) ABSTRACT

An onboard battery includes a battery module; and high-voltage devices. An inside of a housing case is partitioned into respective predetermined parts by a partition plate in the onboard battery. The partition plate has a disposition hole. The onboard battery includes, as the high-voltage devices, a first high-voltage device disposed on the partition plate and a second high-voltage device configured to be cooled by a convection caused by a cooling fan and attached to the partition plate with a part of the second high-voltage device protruding downward from the disposition hole. The partition plate has a discharge hole for a heat emitted from the first high-voltage device. The discharge hole communicates with a heat exhaust path for a heat emitted from the second high-voltage device.

21 Claims, 9 Drawing Sheets

(51) Int. Cl.
  *H01M 10/625* (2014.01)
  *H01M 10/6563* (2014.01)
  *B60K 1/04* (2019.01)
  *H01M 2/10* (2006.01)
  *H01M 10/42* (2006.01)
  *H01M 10/6556* (2014.01)
  *H01M 10/667* (2014.01)
  *B60L 58/26* (2019.01)
  *B60L 50/60* (2019.01)

(52) U.S. Cl.
  CPC ....... *H01M 2/1077* (2013.01); *H01M 10/425* (2013.01); *H01M 10/613* (2015.04); *H01M 10/625* (2015.04); *H01M 10/6556* (2015.04); *H01M 10/6563* (2015.04); *H01M 10/667* (2015.04); *B60K 2001/0438* (2013.01); *H01M 2/1083* (2013.01); *H01M 2220/20* (2013.01)

(56) References Cited

U.S. PATENT DOCUMENTS

| | | | | |
|---|---|---|---|---|
| 7,654,351 | B2* | 2/2010 | Koike | B60K 1/04 |
| | | | | 180/68.1 |
| 2004/0235315 | A1* | 11/2004 | Masui | B60K 1/04 |
| | | | | 439/34 |
| 2007/0040418 | A1* | 2/2007 | Ohkuma | B60K 1/04 |
| | | | | 297/15 |
| 2008/0062622 | A1* | 3/2008 | Fukazu | B60K 1/04 |
| | | | | 361/678 |
| 2009/0167077 | A1* | 7/2009 | Tsuchiya | B60K 1/04 |
| | | | | 307/9.1 |
| 2010/0089675 | A1 | 4/2010 | Nagata et al. | |
| 2010/0099019 | A1 | 4/2010 | Nagata et al. | |
| 2010/0273040 | A1* | 10/2010 | Kubota | B60K 1/04 |
| | | | | 429/100 |
| 2011/0222240 | A1 | 9/2011 | Kawata et al. | |
| 2012/0009456 | A1* | 1/2012 | Sohn | H01M 2/1077 |
| | | | | 429/120 |
| 2014/0004404 | A1 | 1/2014 | Kinoshita et al. | |
| 2014/0072835 | A1* | 3/2014 | Tsujimura | H01M 2/1072 |
| | | | | 429/7 |
| 2016/0211561 | A1* | 7/2016 | Nakagawa | H01M 2/1077 |

FOREIGN PATENT DOCUMENTS

| | | |
|---|---|---|
| CN | 102216100 A | 10/2011 |
| CN | 103430378 A | 12/2013 |
| JP | 06-125156 A | 5/1994 |
| JP | 2008-062780 A | 3/2008 |
| JP | 2010-041809 A | 2/2010 |
| JP | 2012-249483 A | 12/2012 |
| JP | 5206110 B2 | 6/2013 |
| JP | 2013-220782 A | 10/2013 |
| JP | 2014-080118 A | 5/2014 |

OTHER PUBLICATIONS

Office Action for CN Patent Application No. 201710328322.2, dated Mar. 5, 2019, 06 pp. Of Office Action and 07 pages Of English Translation.

* cited by examiner

ONBOARD BATTERY FOR VEHICLE

CROSS-REFERENCE TO RELATED APPLICATIONS

The present application claims priority from Japanese Patent Application No. 2016-100176 filed on May 19, 2016, the entire contents of which are hereby incorporated by

BACKGROUND

1. Technical Field

The present invention relates to the technical field of onboard batteries each having a battery module and a high-voltage device disposed in a housing case.

2. Related Art

Onboard batteries are installed in various vehicles, such as automobiles, in order to supply electric power to motors and other various electrical components.

In recent years, in particular, vehicles such as electric vehicles (EV), hybrid electric vehicles (HEV), and plug-in hybrid electric vehicles (PHEV) have gained widespread use. In these electricity-driven vehicles, onboard batteries having a high electricity-storage function are installed.

Onboard batteries each include a battery module and a high-voltage device housed in a housing case. The battery module is configured by, for instance, arranging battery cells (secondary batteries), such as nickel hydrogen batteries or lithium ion batteries. Instances of the high-voltage device to be installed include inverters and DC/DC converters.

In some onboard batteries to be installed in an electric vehicle or the like, in order to retain a high electricity-storage function, battery modules are disposed in the housing case and battery cells in each of the battery modules are connected in series or in parallel.

Some of these onboard batteries are disposed, for instance, in the cargo room formed in the back of a vehicle, and have a battery module and a high-voltage device respectively disposed, for instance, on the upper and lower shelves in a housing case (e.g., Japanese Patent No. 5206110).

The onboard battery described in Japanese Patent No. 5206110 is partly inserted into a disposition depression having an upward opening in a floor panel, and is located between rear side frames of a vehicle body, which are provided apart from each other in the transversal direction.

Once heat is generated and the temperature rises in the high-voltage device and the battery module of the above-described onboard battery, the heat can cause the high-voltage device and the battery module to be inappropriately driven. Accordingly, it is necessary to cool the high-voltage device and the battery module to prevent the temperature from rising.

Incidentally, an onboard battery has a cover body attached to a housing case in which a battery module and a high-voltage device are housed, and the battery module and the high-voltage device are covered with the cover body. Accordingly, the poor performance of the onboard battery for emitting cooling wind from the internal space of the housing case can cause heat to stay (i.e., what is called accumulated heat), resulting in the malfunction of the high-voltage device.

It is possible in this case to dispose, outside the housing case, the high-voltage device to be disposed at the position of accumulated heat. Disposing the high-voltage device outside the housing case, however, requires not only the cover body, but also shielding countermeasures against electromagnetic noise generated when the high-voltage device is driven. All the higher cost then has to be paid. Further, disposing the high-voltage device outside the housing case can lead to an electric shock caused by contact with the high-voltage device.

SUMMARY OF THE INVENTION

It is desirable to improve the cooling performance for a high-voltage device and ensure the high-voltage device a stable driving state with no increase in the manufacturing cost.

An aspect of the present invention provides an onboard battery in which an inside of a housing case is partitioned into respective predetermined parts by a partition plate, the partition plate having a disposition hole, the onboard battery including: a battery module; and high-voltage devices. The onboard battery includes, as the high-voltage devices, a first high-voltage device disposed on the partition plate and a second high-voltage device configured to be cooled by a convection caused by a cooling fan and attached to the partition plate with a part of the second high-voltage device protruding downward from the disposition hole. The partition plate has a discharge hole for a heat emitted from the first high-voltage device. The discharge hole communicates with a heat exhaust path for a heat emitted from the second high-voltage device.

A flow duct having an internal space as a part of the heat exhaust path may be attached onto a bottom of the partition plate below the disposition hole. The discharge hole may communicate with the internal space of the flow duct.

The flow duct may have a battery cooling hole through which a cooling wind flows to the battery module.

The partition plate may have a first communicating hole and a second communicating hole that respectively communicate with the internal space of the flow duct and a space in the housing case in which the battery module is disposed. A cooling duct may be attached to the partition plate, a part of the cooling duct forking into a first intake part and a second intake part. A cooling wind may flow from the first intake part to the first communicating hole, while a cooling wind flows from the second intake part to the second communicating hole.

A cover body may be attached to the housing case, the cover body covering at least the first high-voltage device, the second high-voltage device, and the battery module. The cover body may have an electric wire insertion hole into which an electric wire is inserted, the electric wire connecting a circuit disposed outside the housing case with the high-voltage device. An outside air may be drawn from the electric wire insertion hole as a cooling wind that cools the first high-voltage device.

The first high-voltage device may be disposed between the electric wire insertion hole and the discharge hole.

DETAILED DESCRIPTION

Figure 1:
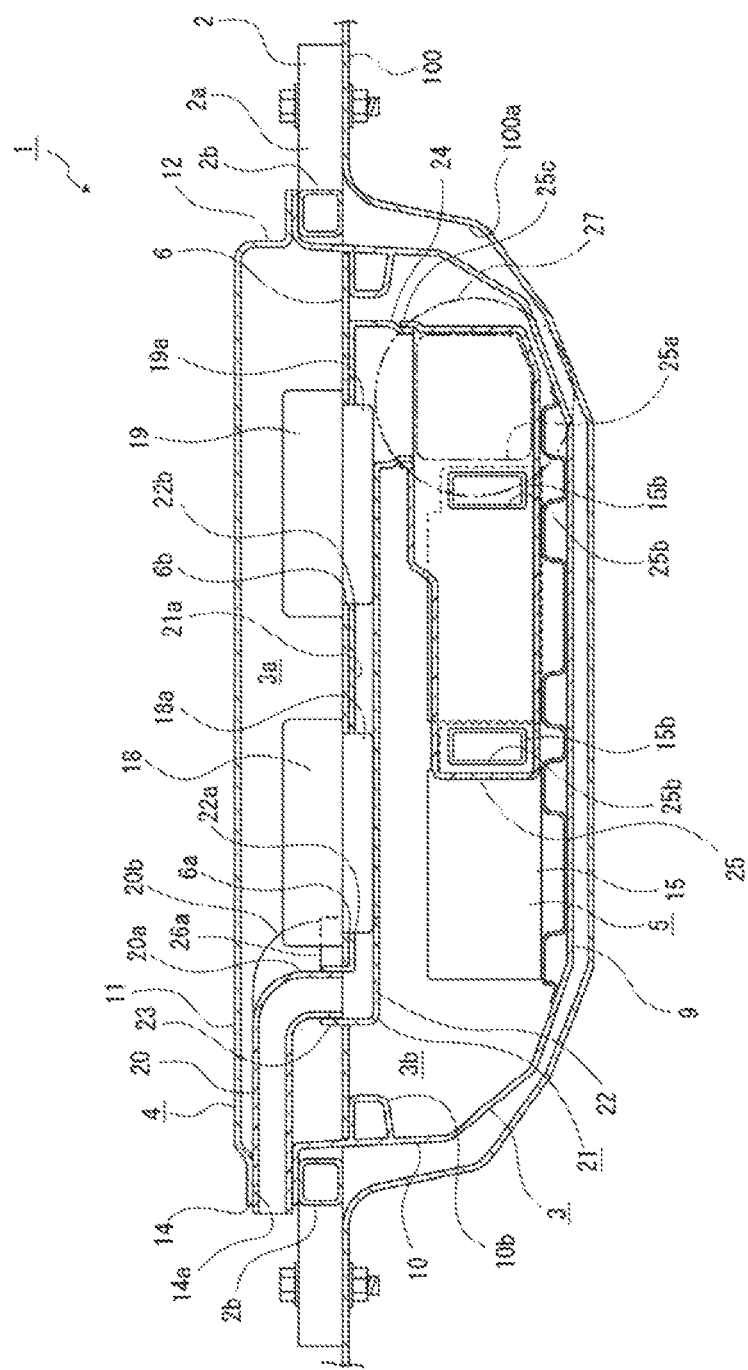
FIG. 1 illustrates an example of an onboard battery according to the present invention together with FIGS. 2 to 9, and is a cross-sectional view of the onboard battery.

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

An example of an onboard battery of the present invention will be described below with reference to the appended drawings.

An onboard battery 1 includes a holding frame 2, a housing case 3, a cover body 4, and two battery modules 5 (see FIGS. 1 to 4).

The onboard battery 1 is partially inserted, for instance, into a disposition depression 100a on a floor panel 100 of a cargo room located behind the rear seats of a vehicle (see FIG. 1).

The holding frame 2 has two first parts 2a that extend in the transversal direction and are located apart from each other in the longitudinal direction and two second parts 2b that extend in the longitudinal direction and are located apart from each other in the transversal direction, which are joined into the shape of parallel crosses (see FIGS. 1 to 4). The left and right both ends of the two first parts 2a project sideward (outward) from the two second parts 2b.

The left and right both ends of the two first parts 2a of the holding frame 2 of the onboard battery 1 are fixed to the floor panel 100 with a bolt or the like.

Inside the housing case 3 is disposed a partition plate 6 with a flat plate shape. The internal space of the housing case 3 is partitioned into an upper housing space 3a and a lower housing space 3b by the partition plate 6.

The partition plate 6 has a first disposition hole 6a and a second disposition hole 6b located apart from each other in the transversal direction. The partition plate 6 respectively has a first communicating hole 6c and a second communicating hole 6d at the left of and in front of the first disposition hole 6a. The partition plate 6 has a discharge hole 6e at the right of the second disposition hole 6b.

A terminal strip 7 is attached to the partition plate 6. Ends of electric wires 8 are connected with the terminal strip 7. The electric wires 8 are led out from the onboard battery 1, and the other ends are connected with a control circuit, a power supply circuit, and the like that are not illustrated.

The housing case 3 has a bottom surface 9 facing the vertical direction and a peripheral surface 10 whose lower edge is continuous with the outer peripheral edge of the bottom surface 9. The upper end of the peripheral surface 10 of the housing case 3 is fixed to the holding frame 2. The right end of the rear surface of the peripheral surface 10 has a coupling hole 10a. The peripheral surface 10 has an annular plate attachment projection 10b protruding inward.

The outer periphery of the partition plate 6 is placed on the plate attachment projection 10b, and attached to the housing case 3.

The cover body 4 is shaped like a shallow box having a downward opening, and has an upper surface 11, and a peripheral part 12 whose upper edge is continuous with the outer peripheral edge of the upper surface 11. The peripheral part 12 has an electric wire insertion hole 13a at a position on the front surface 13 near a left side surface 14. The peripheral part 12 has a duct insertion hole 14a on the left side surface 14.

Figure 5:
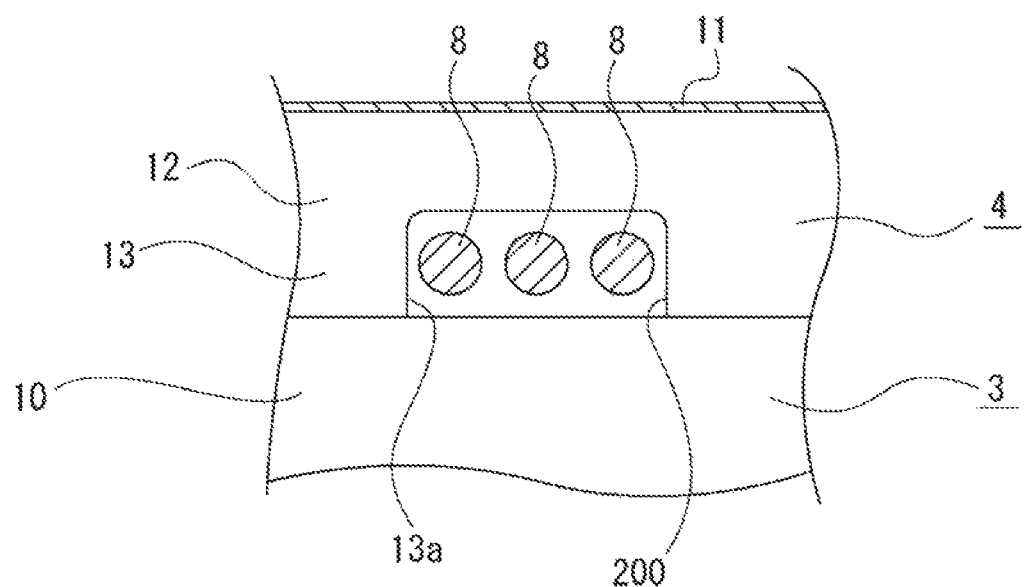
FIG. 5 is an enlarged side view illustrating that an electric wire is inserted into an electric wire insertion hole.

The cover body 4 is placed on the top of the housing case 3, and attached to the housing case 3. The electric wires 8 are inserted into the electric wire insertion hole 13a with the cover body 4 attached to the housing case 3 (see FIG. 5). The electric wire insertion hole 13a has a gap 200 around the electric wires 8, and outside air is drawn into the housing case 3 through the gap 200.

For instance, the two battery modules 5 are located apart from each other in the transversal direction and housed in the lower housing space 3b of the housing case 3 (see FIGS. 1 to 4). The two battery modules 5 are fixed to the bottom surface 9.

Figure 2:
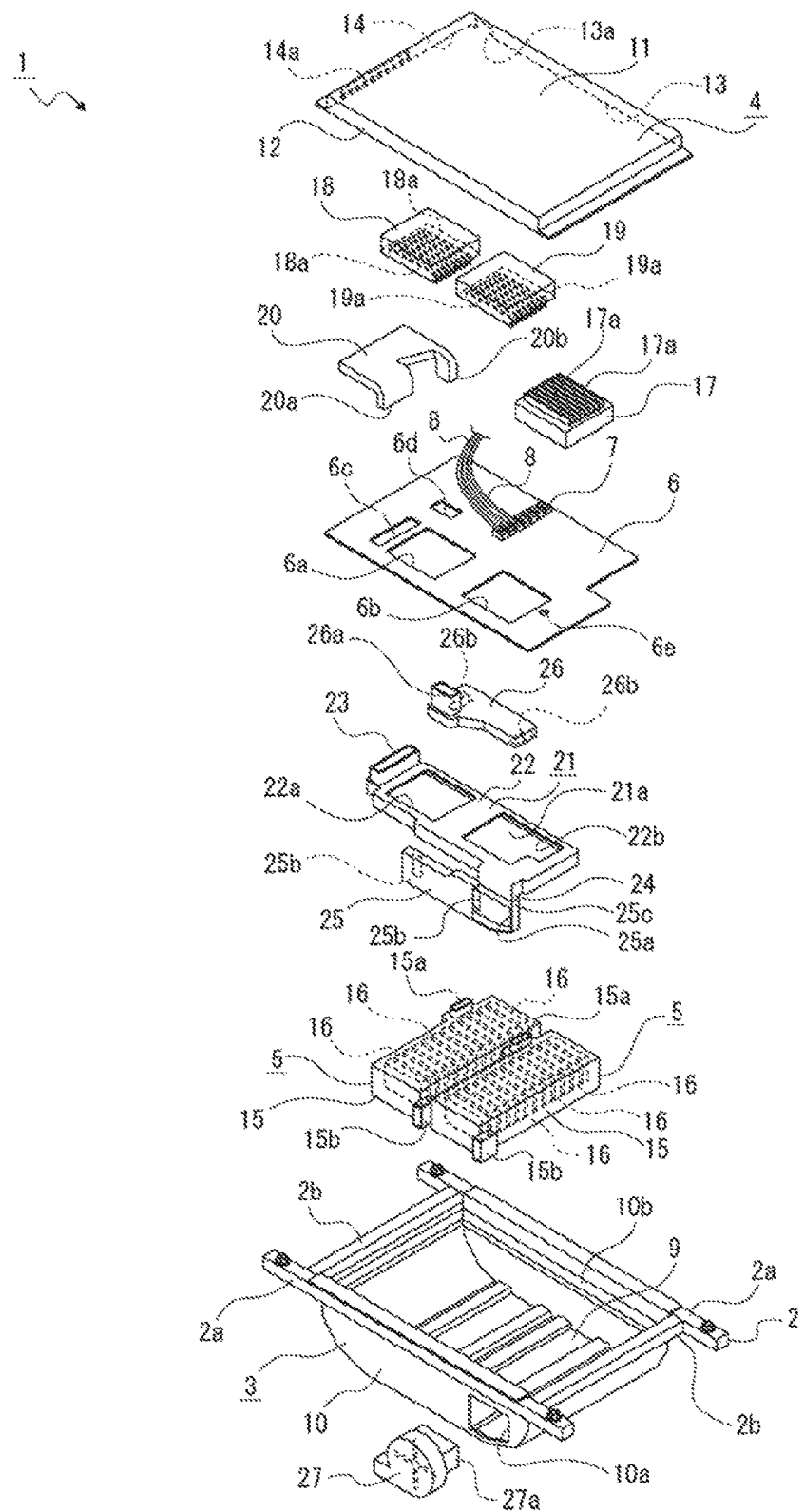
FIG. 2 is an exploded perspective view of the onboard battery.
Figure 3:
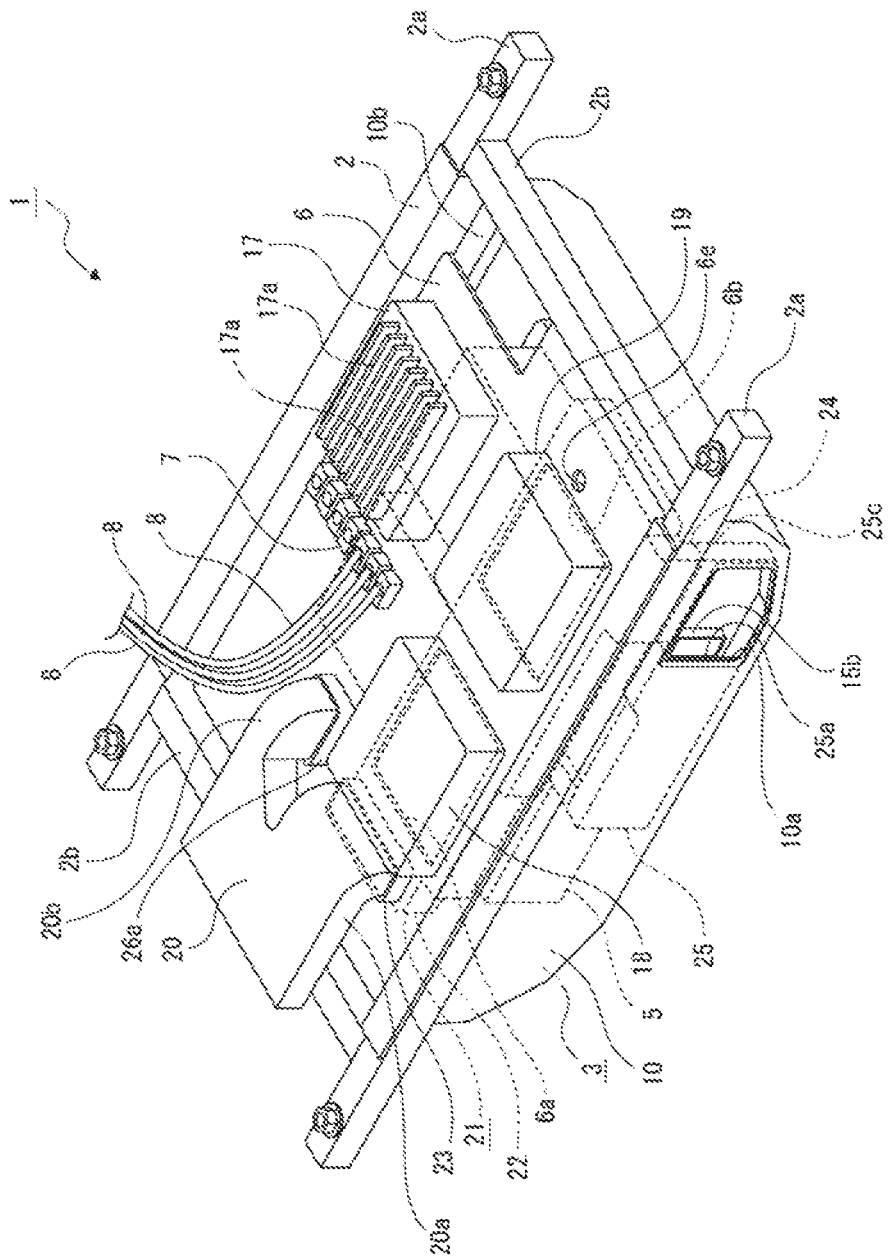
FIG. 3 is a perspective view of the onboard battery with a cover body detached.
Figure 4:
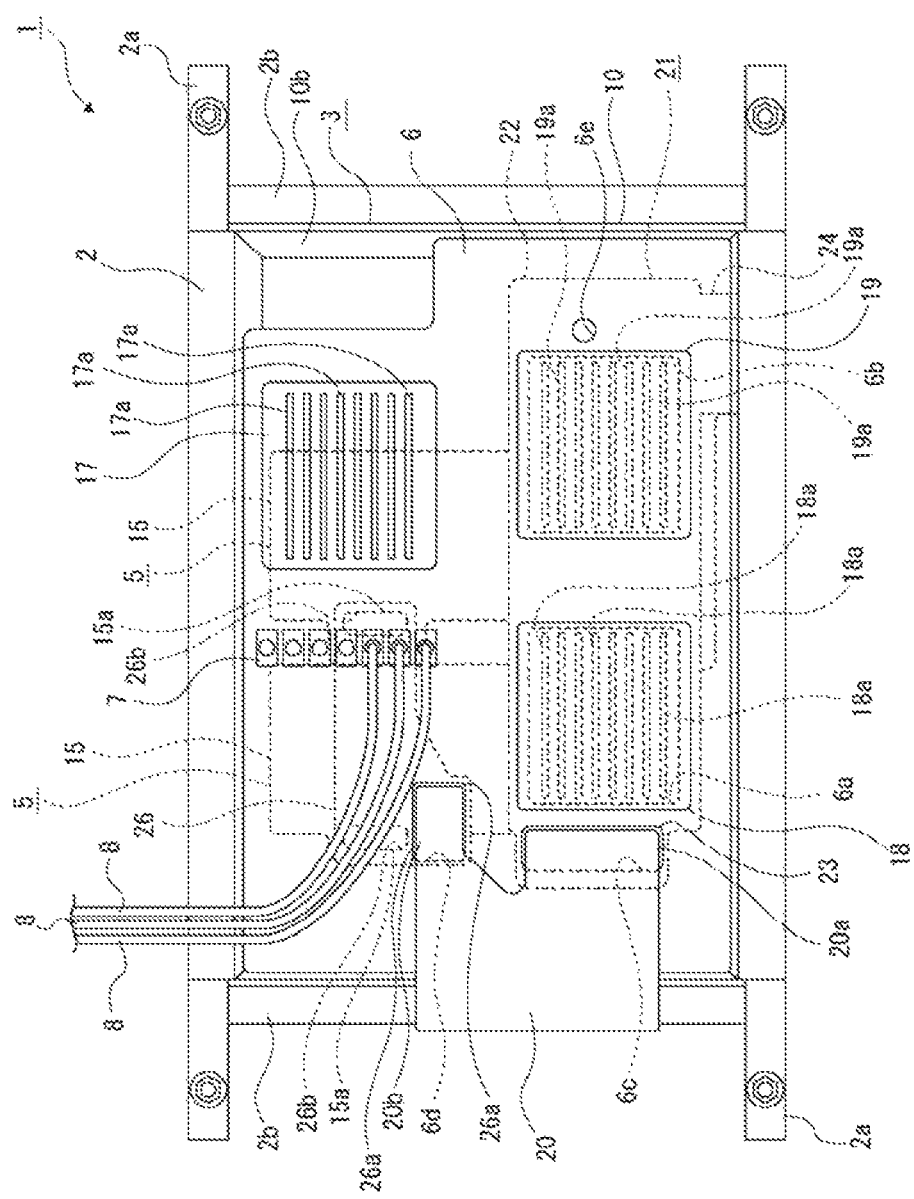
FIG. 4 is a plan view of the onboard battery with the cover body detached.

The battery module 5 includes a cell cover 15 with a box shape whose long-side direction is the longitudinal direction and battery cells 16 arranged side by side in the longitudinal direction inside the cell cover 15 (see FIG. 2). The cell cover 15 has an inflow part 15a and an outflow part 15b located apart from each other in the longitudinal direction.

In the lower housing space 3b of the housing case 3, a battery control unit and a junction box that are not illustrated are housed on opposite sides in the transversal direction with the two battery modules 5 located therebetween. The battery control unit has a function of governing the entire control of the onboard battery 1. The junction box includes a relay, a fuse, a connector terminal, and the like.

There are a first high-voltage device 17 disposed at the right of the terminal strip 7 in the front half of the upper housing space 3a of the housing case 3, and second high-voltage devices 18 and 19 disposed apart from each other in the transversal direction in the rear half (see FIGS. 1 to 4). The first high-voltage device 17 is, for instance, a pump inverter for an electric oil pump. The second high-voltage device 18 is, for instance, a DC/DC converter. The second high-voltage device 19 is, for instance, an inverter for a drive motor.

The first high-voltage device 17 is attached to the top of the partition plate 6. The first high-voltage device 17 includes radiator fins 17a on the top. The radiator fins 17a protrude upward. When the cover body 4 is attached to the housing case 3, the first high-voltage device 17 is disposed between the electric wire insertion hole 13a of the cover body 4 and the discharge hole 6e of the partition plate 6.

The second high-voltage device 18 and the second high-voltage device 19 respectively include radiator fins 18a and radiator fins 19a protruding downward. The second high-voltage device 18 is attached to the top of the partition plate 6 with the radiator fins 18a inserted into the first disposition hole 6a from above as illustrated in FIG. 1, while the second high-voltage device 19 is attached to the top of the partition plate 6 with the radiator fins 19a inserted into the second disposition hole 6b from above.

The two battery modules 5, the battery control unit, the junction box, the terminal strip 7, the first high-voltage device 17, the second high-voltage device 18, and the second high-voltage device 19 are disposed in the housing case 3. All the electrical components for driving the onboard battery 1 are covered with the cover body 4 and disposed in the housing case 3.

Accordingly, the electrical components for driving the onboard battery 1 can be shielded from electromagnetic noise from the outside. The strengthening of electromagnetic shielding ensures the onboard battery 1 an excellent driving state.

The onboard battery 1 includes a cooling duct 20. The cooling duct 20 is inserted into the duct insertion hole 14a of the cover body 4, and attached to the housing case 3. Part of the cooling duct 20 forks apart in the longitudinal direction. The rear forked part serves as a first intake part 20a, and the front forked part serves as a second intake part 20b.

The first intake part 20a and the second intake part 20b of the cooling duct 20 are respectively disposed in association with the first communicating hole 6c and the second communicating hole 6d.

There is a flow duct 21 disposed in the lower housing space 3b of the housing case 3. The flow duct 21 has a flow part 22 having a flat shape that is thin in the vertical direction and long in the transversal direction, an annular coupling projection 23 protruding upward from the left end of the flow part 22, and a joining projection 24 protruding downward from the rear surface of the right end of the flow part 22. An internal space 21a of the flow duct 21 serves as part of the heat exhaust paths of the second high-voltage devices 18 and 19.

The flow duct 21 is attached with the flow part 22 in contact with the bottom of the partition plate 6, and the coupling projection 23 protrudes upward from the first communicating hole 6c (see FIG. 1). The coupling projection 23 protruding upward from the first communicating hole 6c is coupled to the first intake part 20a of the cooling duct 20 (see FIGS. 1 and 6).

The upper surface of the flow part 22 has a first fin insertion hole 22a and a second fin insertion hole 22b located apart from each other in the transversal direction (FIGS. 1 and 2). The first disposition hole 6a, the second disposition hole 6b, and the discharge hole 6e of the partition plate 6 communicate with the internal space 21a of the flow duct 21 via the first fin insertion hole 22a and the second fin insertion hole 22b. The radiator fins 18a of the second high-voltage device 18 and the radiator fins 19a of the second high-voltage device 19 respectively inserted into the first disposition hole 6a and the second disposition hole 6b are inserted into the first fin insertion hole 22a and the second fin insertion hole 22b. The radiator fins 18a and the radiator fins 19a are located in the internal space 21a of the flow duct 21.

Figure 6:
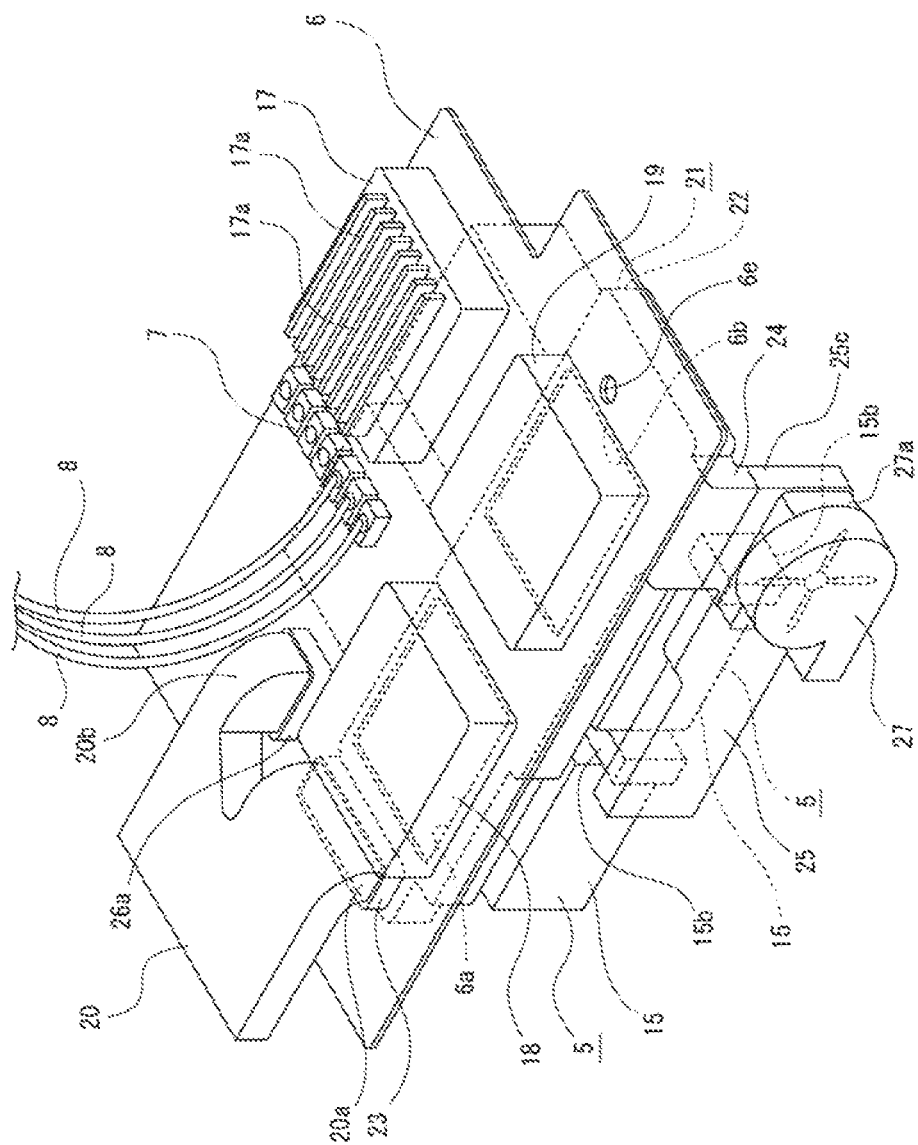
FIG. 6 is a perspective view illustrating part of a structure disposed in a housing case.

The joining projection 24 of the flow duct 21 is joined to a battery exhaust duct 25 (see FIGS. 2 and 6). The battery exhaust duct 25 has a flat shape that is thin in the longitudinal direction and long in the transversal direction, and has an exhaust hole 25a on the rear surface of the right end. The front surface of the battery exhaust duct 25 has two coupling holes 25b located apart from each other in the transversal direction. The right end of the battery exhaust duct 25 has a joining part 25c protruding upward.

The joining part 25c of the battery exhaust duct 25 is joined to the joining projection 24 of the flow duct 21. The battery exhaust duct 25 is coupled to the two battery modules 5 by inserting the two outflow parts 15b of the two cell covers 15 into the two respective coupling holes 25b.

The second intake part 20b of the cooling duct 20 is coupled to a battery intake duct 26. The battery intake duct 26 has a flat shape that is thin in the vertical direction and long in the transversal direction, and has a coupling part 26a at the left end. The coupling part 26a protrudes upward. The bottom surface of the battery intake duct 26 has two intake holes 26b located apart from each other in the transversal direction.

Figure 7:
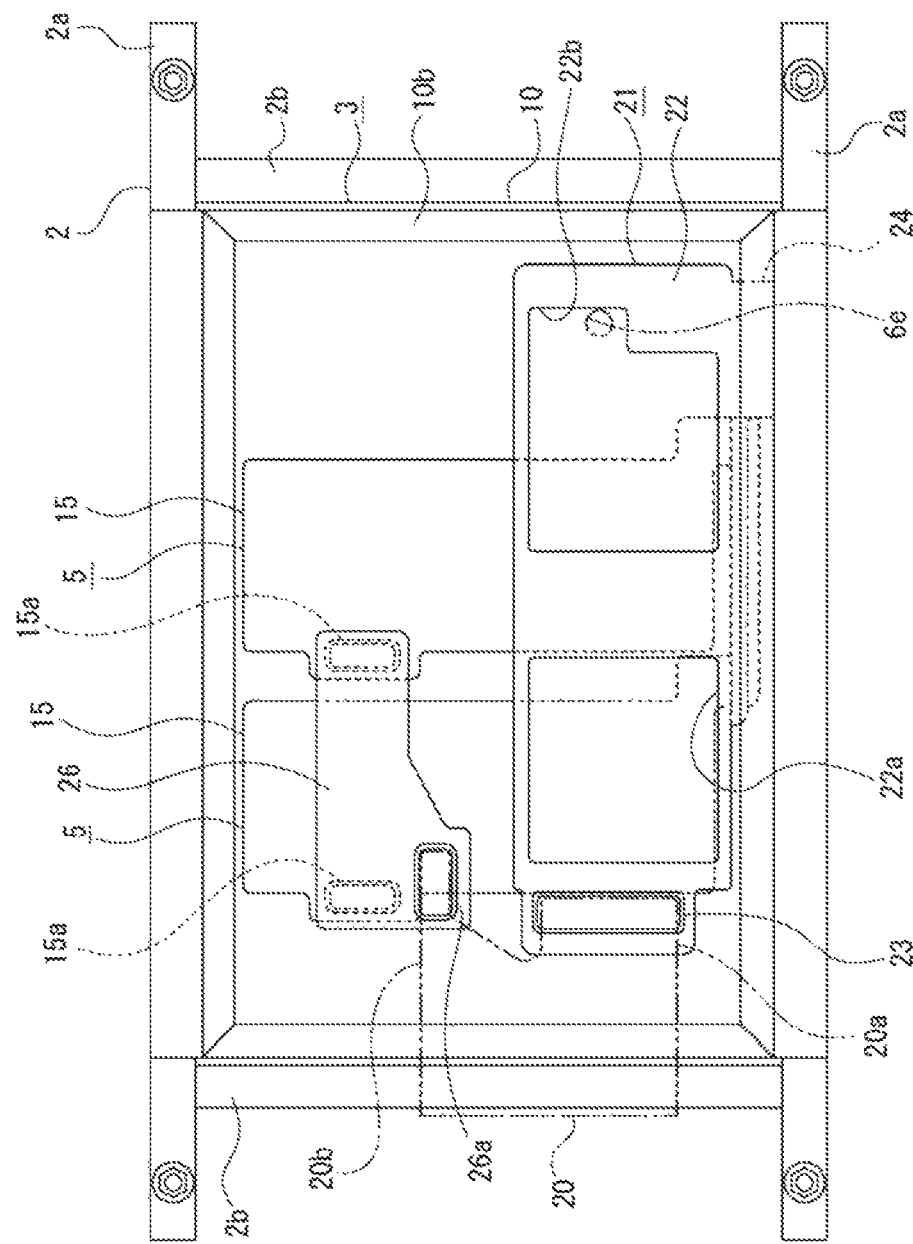
FIG. 7 is a plan view illustrating each part of a path of cooling wind.
Figure 8:
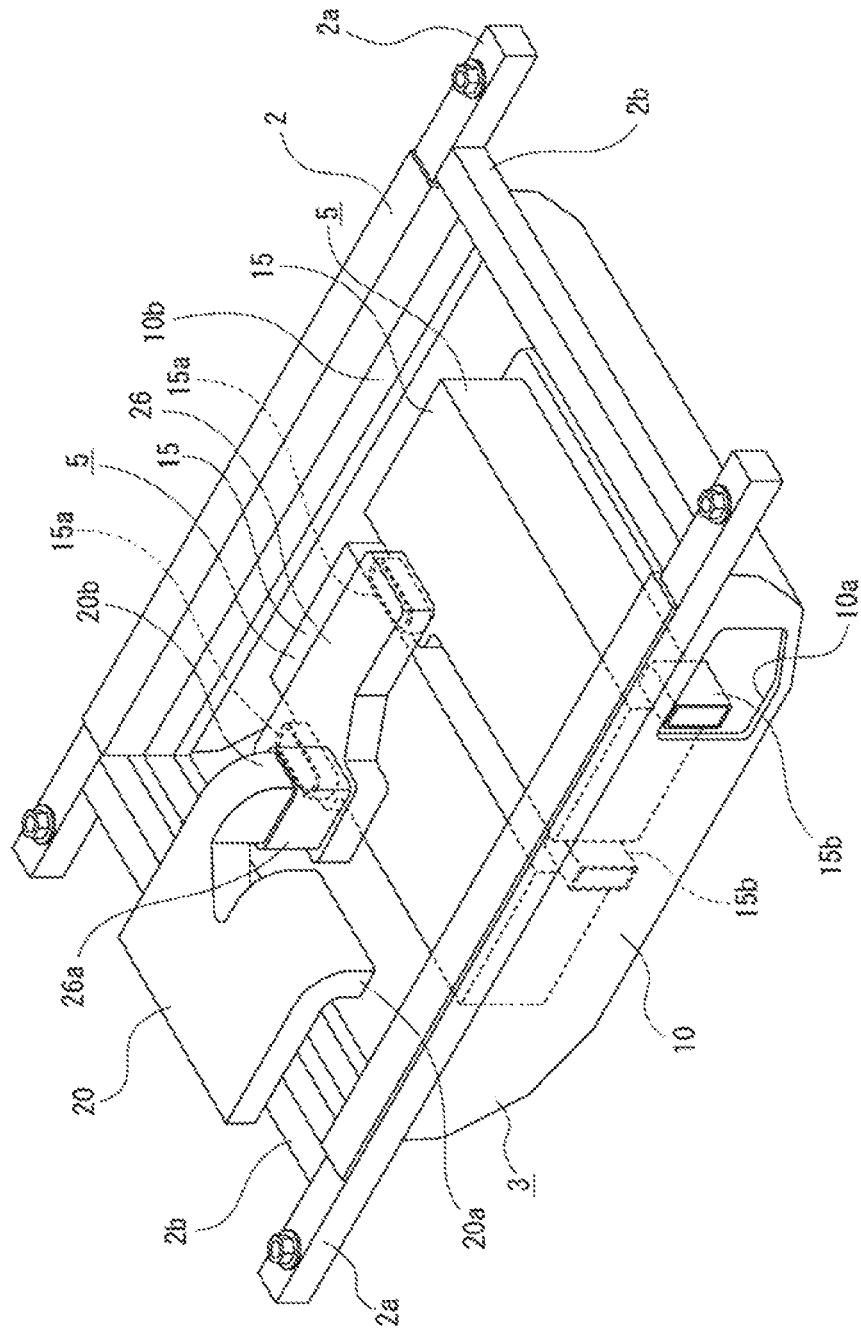
FIG. 8 is a perspective view illustrating each part of the path of cooling wind.

The coupling part 26a of the battery intake duct 26 protrudes upward from the second communicating hole 6d (see FIGS. 6 and 7). The coupling part 26a protruding upward from the second communicating hole 6d is coupled to the second intake part 20b of the cooling duct 20 (see FIGS. 6 and 8). The battery intake duct 26 is coupled to the two battery modules 5 by inserting the two inflow parts 15a of the two cell covers 15 into the two respective intake holes 26b.

The battery exhaust duct 25 is coupled to a cooling fan 27 (see FIGS. 2 and 6). The cooling fan 27 is, for instance, a discharge fan for discharging drawn air to the outside. The cooling fan 27 has a coupling projection 27a protruding forward. The coupling projection 27a is inserted into the coupling hole 25b through the coupling hole 10a on the peripheral surface 10 of the housing case 3, and coupled to the battery exhaust duct 25.

Once the cooling fan 27 rotates in the onboard battery 1 configured as described above, air is drawn into the cooling duct 20 as cooling wind. The cooling wind then flows from the first intake part 20a of the cooling duct 20 to the flow duct 21, while the cooling wind flows from the second intake part 20b of the cooling duct 20 to the battery intake duct 26.

The cooling wind flowing to the flow duct 21 flows through the internal space 21a of the flow duct 21, and is then blown against the radiator fins 18a and 19a of the second high-voltage devices 18 and 19. This cools the second high-voltage devices 18 and 19, and prevents the temperature of the second high-voltage devices 18 and 19 from rising. The second high-voltage devices 18 and 19 are thus compulsorily cooled by the cooling wind generated by the rotation of the cooling fan 27, and prevented from rising in temperature.

The cooling wind that has flowed through the internal space 21a of the flow duct 21 is discharged by the cooling fan 27 to the outside of the onboard battery 1 via the exhaust hole 25a of the battery exhaust duct 25.

Meanwhile, the cooling wind flowing to the battery intake duct 26 flows in the two cell covers 15 of the two battery modules 5 from the two respective intake holes 26b of the battery intake duct 26, and is blown against the battery cells 16 to cool the battery cells 16 and prevent the temperature of the two battery modules 5 from rising. Thus, similarly to the second high-voltage devices 18 and 19, the two battery modules 5 are also compulsorily cooled by the cooling wind generated by the rotation of the cooling fan 27, and prevented from rising in temperature.

The cooling wind that has flowed in the two cell covers 15 flows into the battery exhaust duct 25 from the two coupling holes 25b, and is discharged by the cooling fan 27 to the outside of the onboard battery 1 via the exhaust hole 25a of the battery exhaust duct 25.

Further, outside air is drawn into the upper housing space 3a of the housing case 3 from the gap 200 of the electric wire insertion hole 13a on the cover body 4. Then, the discharge hole 6e of the partition plate 6, which communicates with the internal space 21a of the flow duct 21 via the second fin insertion hole 22b, has airflow caused by the cooling fan 27 from the upper housing space 3a to the internal space 21a.

The air drawn from the gap 200 of the electric wire insertion hole 13a is thus drawn into the discharge hole 6e through the area around the first high-voltage device 17, and discharged by the cooling fan 27 to the outside of the onboard battery 1 from the discharge hole 6e via the internal space 21a of the flow duct 21 and the exhaust hole 25a of the battery exhaust duct 25.

As described above, the air drawn from the gap 200 of the electric wire insertion hole 13a is drawn into the discharge hole 6e through the area around the first high-voltage device 17. Accordingly, this air cools the first high-voltage device 17 and prevents the temperature of the first high-voltage device 17 from rising.

As described above, the onboard battery 1 has the discharge hole 6e on the partition plate 6 for the heat emitted from the first high-voltage device 17. The discharge hole 6e communicates with the internal space 21a of the flow duct 21 serving as the heat exhaust path for the heat emitted from the second high-voltage devices 18 and 19.

The heat emitted from the first high-voltage device 17 via the discharge hole 6e is discharged to the heat exhaust path for the heat emitted from the second high-voltage devices 18 and 19. Accordingly, covering the first high-voltage device 17 and the second high-voltage devices 18 and 19 as shielding countermeasures against electromagnetic noise is less likely to cause accumulated heat in the area around the first high-voltage device 17 in the upper housing space 3a of the housing case 3. It is possible to improve the cooling performance for the first high-voltage device 17, and ensure the first high-voltage device a stable driving state with no increase in the manufacturing cost.

Further, the flow duct 21 having the internal space 21a as part of the heat exhaust path is attached onto the bottom of the partition plate 6 below the first disposition hole 6a and the second disposition hole 6b. The discharge hole 6e communicates with the internal space 21a of the flow duct 21.

The heat generated by the first high-voltage device 17 and discharged from the discharge hole 6e is thus emitted from the flow duct 21, and it is possible with a simple structure to definitely prevent the temperature of the first high-voltage device 17 from rising.

Moreover, the partition plate 6 has the first communicating hole 6c and the second communicating hole 6d. The cooling duct 20, part of which forks into the first intake part 20a and the second intake part 20b, is attached to the partition plate 6. Cooling wind flows from the first intake part 20a to the first communicating hole 6c, while cooling wind flows from the second intake part 20b to the second communicating hole 6d.

Cooling wind thus flows to the internal space 21a of the flow duct 21 via the first intake part 20a of the cooling duct 20, while cooling wind flows to the two battery modules 5 via the second intake part 20b of the cooling duct 20. Accordingly, it is possible to simplify the structure, and then ensure excellent cooling performance for the first high-voltage device 17, the second high-voltage devices 18 and 19, and the two battery modules 5.

Still further, the cover body 4 that covers at least the first high-voltage device 17, the second high-voltage devices 18 and 19, and the two battery modules 5 is attached to the housing case 3. The cover body 4 has the electric wire insertion hole 13a, into which the electric wires 8 are inserted. Outside air is drawn from the electric wire insertion hole 13a as cooling wind for cooling the first high-voltage device 17.

The air drawn from the electric wire insertion hole 13a thus cools the first high-voltage device 17. Accordingly, there is no need to prepare a dedicated flow path of the cooling wind for cooling the first high-voltage device 17, and it is then possible to simplify the structure, and prevent the temperature of the first high-voltage device 17 from rising.

In addition, the first high-voltage device 17 is disposed between the electric wire insertion hole 13a of the cover body 4 and the discharge hole 6e of the partition plate 6. The first high-voltage device 17 is then positioned on the path of the cooling wind drawn from the electric wire insertion hole 13a and discharged from the discharge hole 6e, thereby making it possible to improve the cooling efficiency for the first high-voltage device 17.

Figure 9:
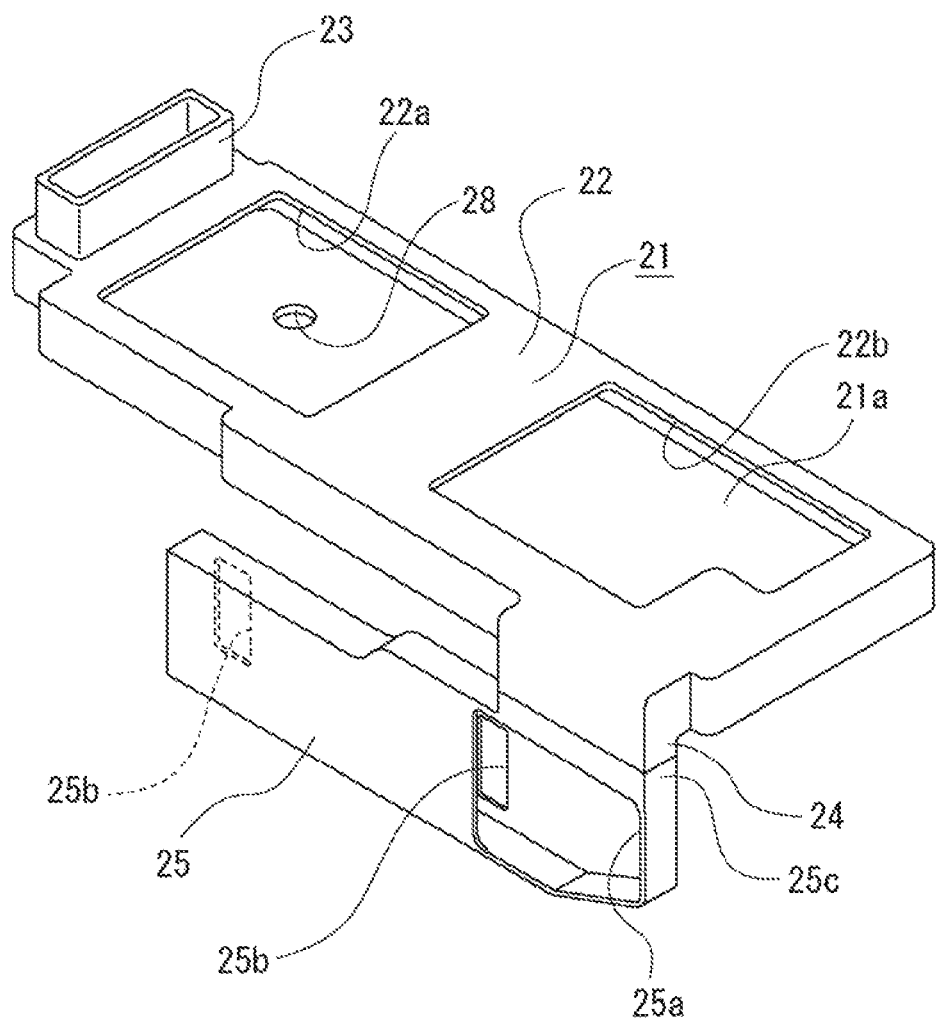
FIG. 9 is a perspective view illustrating an instance in which a flow duct has a battery cooling hole.

Additionally, the above describes an instance in which cooling wind flows into the two battery modules 5 from the second intake part 20b of the cooling duct 20 via the battery intake duct 26. However, for instance, as illustrated in FIG. 9, the flow duct 21 may have a hole serving as a battery cooling hole 28, and there may be provided a duct coupling the two battery modules 5 to the flow duct 21 to make cooling wind flow from the battery cooling hole 28 into the two battery modules 5.

In this way, the battery cooling hole 28 on the flow duct 21 causes part of the cooling wind flowing through the internal space 21a of the flow duct 21 to flow to the two battery modules 5. It is therefore possible to improve the cooling performance for the two battery modules 5.

Further, the above describes an instance in which the rotation of the cooling fan 27 causes the cooling wind drawn from the cooling duct 20 to flow to the cooling fan 27. However, if the cooling fan serves as a fan that makes cooling wind to the cooling duct 20 or there is provided a cooling fan near the cooling duct 20, it is also possible to discharge cooling wind from the cooling duct 20 in contrast to the above.

In this case, cooling wind flows from the discharge hole 6e of the partition plate 6 to the gap 200 of the electric wire insertion hole 13a on the cover body 4 via the upper housing space 3a of the housing case 3, cools the first high-voltage device 17, and prevents the temperature of the first high-voltage device 17 from rising.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claims is:

1. An onboard battery, comprising:
   a housing case in which an inside space is defined;
   a partition plate that partitions the inside space into respective predetermined spaces, the partition plate including:
      a first surface having an attached region;
      a second surface opposite to the first surface; and
      penetrating holes defined by the first surface and the second surface, wherein the penetrating holes include:
         a disposition hole defined by the first surface and the second surface, wherein the disposition hole is disposed apart from the attached region; and
         a discharge hole defined by the first surface and the second surface, wherein the discharge hole is disposed apart from the attached region and the disposition hole;
   a battery module disposed within the inside space; and high-voltage devices including:
- a first high-voltage device disposed on the attached region, wherein the first high-voltage device includes:
  - an attaching surface in contact with the attached region;
  - a top surface opposed to the attaching surface; and first radiator fins protruded from the top surface; and
- a second high-voltage device that includes second radiator fins protruded through the disposition hole in a direction from the first surface to the second surface,
  - wherein the second radiator fins of the second high-voltage device are disposed on a flow path of an airflow generated by a cooling fan, and
  - wherein the discharge hole communicates with the flow path, and passes airflow from a space defined in the housing case by the first surface to the flow path.

2. The onboard battery according to claim 1, wherein
a flow duct including an internal space as a part of the flow path is attached onto the second surface, and
the discharge hole and the disposition hole communicate with the internal space of the flow duct.

3. The onboard battery according to claim 2, wherein the flow duct has a battery cooling hole through which a cooling wind flows to the battery module.

4. The onboard battery according to claim 3, wherein
the partition plate has a first communicating hole and a second communicating hole that respectively communicate with the internal space of the flow duct and a space of the respective predetermined spaces of the housing case in which the battery module is disposed,
a cooling duct is attached to the partition plate, a part of the cooling duct forking into a first intake part and a second intake part, and
a cooling wind flows from the first intake part to the first communicating hole, while a cooling wind flows from the second intake part to the second communicating hole.

5. The onboard battery according to claim 4, wherein
a cover body is attached to the housing case, the cover body covering at least the first high-voltage device, the second high-voltage device, and the battery module,
the cover body has an electric wire insertion hole into which an electric wire is inserted, the electric wire connecting a circuit disposed outside the housing case with the high-voltage devices, and
an outside air is drawn from the electric wire insertion hole to cool the first high voltage device.

6. The onboard battery according to claim 5, wherein the first high-voltage device is disposed between the electric wire insertion hole and the discharge hole.

7. The onboard battery according to claim 3, wherein
a cover body is attached to the housing case, the cover body covering at least the first high-voltage device, the second high-voltage device, and the battery module,
the cover body has an electric wire insertion hole into which an electric wire is inserted, the electric wire connecting a circuit disposed outside the housing case with the high-voltage devices, and
an outside air is drawn from the electric wire insertion hole to cool the first high-voltage device.

8. The onboard battery according to claim 7, wherein the first high-voltage device is disposed between the electric wire insertion hole and the discharge hole.

9. The onboard battery according to claim 2, wherein
the partition plate has a first communicating hole and a second communicating hole that respectively communicate with the internal space of the flow duct and a space of the respective predetermined spaces of the housing case in which the battery module is disposed,
a cooling duct is attached to the partition plate, a part of the cooling duct forking into a first intake part and a second intake part, and
a cooling wind flows from the first intake part to the first communicating hole, while a cooling wind flows from the second intake part to the second communicating hole.

10. The onboard battery according to claim 9, wherein
a cover body is attached to the housing case, the cover body covering at least the first high-voltage device, the second high-voltage device, and the battery module,
the cover body has an electric wire insertion hole into which an electric wire is inserted, the electric wire connecting a circuit disposed outside the housing case with the high-voltage devices, and
an outside air is drawn from the electric wire insertion hole to cool the first high-voltage device.

11. The onboard battery according to claim 10, wherein the first high-voltage device is disposed between the electric wire insertion hole and the discharge hole.

12. The onboard battery according to claim 2, wherein
a cover body is attached to the housing case, the cover body covering at least the first high-voltage device, the second high-voltage device, and the battery module,
the cover body has an electric wire insertion hole into which an electric wire is inserted, the electric wire connecting a circuit disposed outside the housing case with the high-voltage devices, and
an outside air is drawn from the electric wire insertion hole to cool the first high-voltage device.

13. The onboard battery according to claim 12, wherein the first high-voltage device is disposed between the electric wire insertion hole and the discharge hole.

14. The onboard battery according to claim 1, wherein
a cover body is attached to the housing case, the cover body covering at least the first high-voltage device, the second high-voltage device, and the battery module,
the cover body has an electric wire insertion hole into which an electric wire is inserted, the electric wire connecting a circuit disposed outside the housing case with the high-voltage devices, and
an outside air is drawn from the electric wire insertion hole to cool the first high-voltage device.

15. The onboard battery according to claim 14, wherein the first high-voltage device is disposed between the electric wire insertion hole and the discharge hole.

16. The onboard battery according to claim 1, wherein an entirety of the attaching surface is in touch with the attached region.

17. The onboard battery according to claim 1, wherein
a flow duct including an internal space as a part of the flow path is attached onto the second surface,
the discharge hole and the disposition hole communicate with the internal space of the flow duct,
and an entirety of the attaching surface is in touch with the attached region.

18. The onboard battery according to claim 1, wherein
a flow duct including an internal space as a part of the flow path is attached onto the second surface,
the discharge hole and the disposition hole communicate with the internal space of the flow duct, and the second radiator fins are disposed in the internal space of the flow duct.

19. The onboard battery according to claim 1, wherein a cover body is attached to the housing case, the cover body covering at least the first high-voltage device and the second high-voltage device, the cover body has an electric wire insertion hole through which an electric wire connecting a circuit disposed outside the housing case with the high-voltage devices is passed, an outside air is directed from the electric wire insertion hole through an area around the first high-voltage device to the discharge hole.

20. An onboard battery, comprising:
a housing case in which an inside space is defined;
a partition plate that partitions the inside space into respective predetermined spaces, the partition plate including:
  a first surface having an attached region;
  a second surface opposite to the first surface; and
  penetrating holes defined by the first surface and the second surface, wherein the penetrating holes include:
    a disposition hole defined by the first surface and the second surface, wherein the disposition hole is disposed apart from the attached region; and
    a discharge hole defined by the first surface and the second surface, wherein the discharge hole is disposed apart from the attached region and the disposition hole;
a battery module disposed within the inside space; and
high-voltage devices including:
  a first high-voltage device disposed on the attached region; and
  a second high-voltage device including a part protruded through the disposition hole in a direction from the first surface to the second surface, wherein
    the part of the second high-voltage device is disposed on a flow path of an airflow generated by a cooling fan,
    the discharge hole communicates with the flow path, and passes airflow from a space defined in the housing case by the first surface to the flow path,
    a flow duct including an internal space as a part of the flow path is attached onto the second surface,
    the discharge hole and the disposition hole communicate with the internal space of the flow duct,
    the partition plate further has a first communicating hole and a second communicating hole that respectively communicate with the internal space of the flow duct and a space of the respective predetermined spaces of the housing case in which the battery module is disposed,
    a cooling duct is attached to the partition plate, a part of the cooling duct forking into a first intake part and a second intake part, and
    a cooling wind flows from the first intake part to the first communicating hole, while a cooling wind flows from the second intake part to the second communicating hole.

21. An onboard battery, comprising:
a housing case in which an inside space is defined;
a partition plate that partitions the inside space into respective predetermined spaces, the partition plate including:
  a first surface having an attached region;
  a second surface opposite to the first surface; and
  penetrating holes defined by the first surface and the second surface, wherein the penetrating holes include:
    a disposition hole defined by the first surface and the second surface, wherein the disposition hole is disposed apart from the attached region; and
    a discharge hole defined by the first surface and the second surface, wherein the discharge hole is disposed apart from the attached region and the disposition hole;
a battery module disposed within the inside space; and
high-voltage devices including:
  a first high-voltage device disposed on the attached region; and
  a second high-voltage device including a part protruded through the disposition hole in a direction from the first surface to the second surface, wherein
    the part of the second high-voltage device is disposed on a flow path of an airflow generated by a cooling fan,
    the discharge hole communicates with the flow path, and passes airflow from a space defined in the housing case by the first surface to the flow path,
    a flow duct including an internal space as a part of the flow path is attached onto the second surface,
    the discharge hole and the disposition hole communicate with the internal space of the flow duct,
    the flow duct has a battery cooling hole through which a cooling wind flows to the battery module,
    the partition plate further has a first communicating hole and a second communicating hole that respectively communicate with the internal space of the flow duct and a space of the respective predetermined spaces of the housing case in which the battery module is disposed,
    a cooling duct is attached to the partition plate, a part of the cooling duct forking into a first intake part and a second intake part, and
    a cooling wind flows from the first intake part to the first communicating hole, while a cooling wind flows from the second intake part to the second communicating hole.

* * * * *